INVENTOR
GEORGE R. MADEWELL
WALTER G. HILL JR.

By C.F.Bryant
ATTORNEY

United States Patent

[11] 3,611,119

| [72] | Inventors | George R. Madewell<br>Hixson, Tenn.;<br>Walter G. Hill, Jr., Rossville, Ga. |
|---|---|---|
| [21] | Appl. No. | 825,792 |
| [22] | Filed | May 19, 1969 |
| [45] | Patented | Oct. 5, 1971 |
| [73] | Assignee | Combustion Engineering, Inc.<br>Windson, Conn. |

[54] METHOD FOR MEASURING THE FERRITE CONTENT OF A MATERIAL
6 Claims, 4 Drawing Figs.

[52] U.S. Cl. .................................................. 324/34
[51] Int. Cl. ........................................... G01r 33/12
[50] Field of Search ............................................ 324/34, 40

[56] References Cited
UNITED STATES PATENTS

| 1,952,185 | 3/1934 | Smith | 324/34 |
| 2,935,874 | 5/1960 | Morgan, Jr. | 324/34 |
| 2,957,129 | 10/1960 | Irwin | 324/40 |
| 3,378,763 | 4/1968 | Hastings | 324/40 |

*Primary Examiner*—Rudolph V. Rolinec
*Assistant Examiner*—R. J. Corcoran
*Attorneys*—Carlton F. Bryant, Eldon H. Luther, Robert L. Olson, John F. Carney, Richard H. Berneike, Edward L. Kochey, Jr. and Lawrence P. Kessler ABSTRACT: The apparatus and method for measuring the relative ferrite content of materials. The system is particularly applicable in determining the relative delta ferrite content of austenitic stainless steel weld metal, castings, or wrought products. The instrument is of the eddy current type and employs a pair of AC energized coils located near and differentially spaced from the test material for inducing eddy currents in said material. The loading of each coil is affected by its location with respect to the test material and by the ferrite content of said material. A bridge network which includes the two coils, may be null balanced for a sample of particular ferrite content and samples of different ferrite contents will unbalance the bridge and result in a bridge output voltage which has a substantially linear relationship to the relative ferrite content of the material being tested.

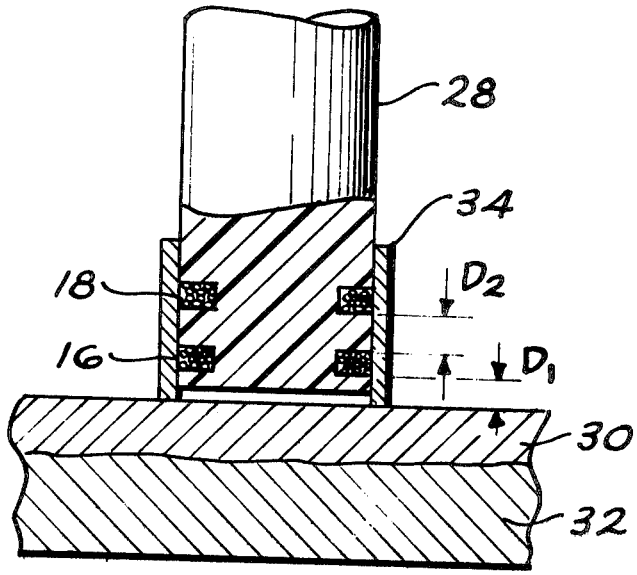

METHOD FOR MEASURING THE FERRITE CONTENT OF A MATERIAL

BACKGROUND OF THE INVENTION

The present system relates to nondestructively determining the relative ferrite content of a material and relates more specifically to the eddy current type of detection system for continuously determining a wide range of relative ferrite concentrations.

In the manufacture of various materials and particularly austenitic stainless steel welds, castings, and wrought products, it is desirable that a controlled amount of ferrite (delta phase) be present in the material to suppress the tendency to hot short cracking of weld metal or castings during deposition and solidification. When the content of delta ferrite is below a critical amount, the hot short cracking is likely to occur and can be very troublesome and expensive. Further in the presence of certain corrosive media, a controlled delta ferrite content in stainless steel may substantially improve corrosion resistance.

However, excessive delta ferrite content can be highly objectional under certain conditions of surface environment such as high-operating temperature, corrosive media, and even fabrication heat treatment. In some cases of excessive delta ferrite contents, brittleness may be induced or poor corrosion resistance may result. Because of the aforementioned effects of delta ferrite concentrations in materials such as stainless steel, it is of considerable importance that the ferrite content be measured and controlled. An area in which ferrite control is extremely important is the austenitic stainless steel cladding of nuclear and refining process vessels. In certain of these applications, ferrite contents of the cladding must be within narrow limits to satisfy present quality requirements. Typically, such cladding would be over a base structure of low alloy steel and the cladding thickness might be anywhere between 0.05-0.75 inch. The mixing or dilution of the weld metal by the base material is primarily responsible for the delta ferrite content of the clad surface. The amount of dilution can vary depending on welding conditions and techniques. Therefore, it is necessary to check the delta ferrite vary of the clad surface frequently during fabrication on the shop floor.

At present, the three general methods used to measure delta ferrite concentrations include: X-ray defraction, metallographic, and magnetic. Of these, the X-ray defraction and metallographic methods do not lend themselves to portable, nondestructive operation in the shop and are therefore unsatisfactory for rapid and flexible operation.

Present magnetic methods for delta ferrite determinations utilize either magnetic attraction or eddy currents for providing an indication of ferrite concentrations. Both of these methods permit the required portability of operation but have attendant disadvantages.

In the systems relying on measurement of the magnetic attraction of the material as an indication of ferrite content, the attraction of the metal in question is compared with a known standard magnet. This generally requires using a plurality of discrete permanent magnets each having a different magnetic strength. The determination is usually expressed as a range of possible ferrite content in relation to the known standard (i.e. ±1 percent). Thus the determination can be no more accurate than the incremental range of the respective magnets. Other factors which contribute to the disadvantages in this type of ferrite measurement system include such things as nonhomogeneous distribution of the delta ferrite which can cause variable results because of the small area of magnet contact, surface conditions which may effect magnet contact, and variations in clad thickness which affect test results because of the proximity effect of a ferromagnetic low alloy steel base metal beneath the stainless steel cladding.

The present system which measure flux variations or magnetic permeability through use of induced eddy currents, while avoiding some of the disadvantages earlier mentioned, fail to provide accurate and linear measurements in the upper and lower limits of the specified ferrite range (0–30 percent). Existing systems of this type additionally have experienced variations in their readings due to changes in the ambient conditions at the test area. Further, these ferrite detectors have been somewhat limited in applicability when the cladding material being tested was over a ferromagnetic low alloy steel base metal and the cladding was less than 0.15 inches thick. In such instances, the proximity loading the high ferrite base metal strongly affects the ferrite readings of the detector.

SUMMARY

According to the present invention, a ferrite detector of the eddy current type is provided with a probe having two test coils so positioned with respect to one another and with respect to a test material when in testing operation, that they are similarly affected by environmental conditions, such as heating, but are affected to different extents by the eddy currents induced in the test material. Each coil has an apparent impedance, hereinafter referred to as impedance, which differs according to the loading occasioned by the electromagnetic coupling between the coils and test material. The coil which is closest to the test material is affected to a greater extent than that more distant. A change in the ferrite content of the test material produces corresponding changes in the impedances of each of the coils.

A relationship of the coil impedance may be established which is linearly proportional to the ferrite content of the test material. The ratio of the impedance of one coil to the sum of the impedances of both coils is linearly proportional to the relative ferrite content of the material being measured, thus providing the stated relationship.

A four-arm impedance bridge which includes the two coils connected in series across its input as two of its impedance arms will accomplish a twofold purpose. First, it will establish a measurable value for the above mentioned impedance relationship of the coils and secondly, the noncoil side of the bridge may be null balanced to some convenient reference impedance relationship. The bridge output is a signal whose magnitude is linearly proportional to the ferrite content of the material being measured. As the signal magnitude is linearly proportional to the relative ferrite content of the material being tested, an output indicator responsive to the signal magnitude may be calibrated to indicate the relative ferrite content (in percent) of the material being tested.

This instrument, therefore, is capable of providing an accurate indication of the relative ferrite content of materials over a broad range of ferrite concentrations (typically 0–30 percent) while avoiding the disadvantages of prior art systems which resulted from errors created by ambient conditions. By locating both coils near the test material, they are both affected to the same extent by changes in the ambient conditions such as heating.

Further, the ferrite readings are an average of a substantial surface area established by the cross-sectional area of the probe, thereby lessening the effects of nonhomogeneous distribution of the delta ferrite in a test material.

Additionally, the accuracy of the instrument is affected little by surface conditions because no contact is required between the test coils and the material being tested. The coils may be located a short distance from the test material when testing as determined by the frequency of the energizing current. Proper selection of the operating frequency reduces or eliminates the effect of a ferromagnetic base metal under a stainless steel clad which is being tested.

DESCRIPTION OF THE PREFERRED EMBODIMENT

The ferrite detector of the invention operates on the eddy current principal and relies on the change in magnetic permeability from one test material to the next to effect a change in the loading relationship of the probe coils. The change in the loading relationship in turn controls output means to provide a quantitative indication of a property of the test material which is dependent on permeability. While the detector of the invention is described in its preferred embodiment as providing an indication of the ferrite content of austenitic stainless steel, it will be realized that it may be employed to determine the ferrite content of other ferrite-containing materials which would affect it similarly.

Figure 1:
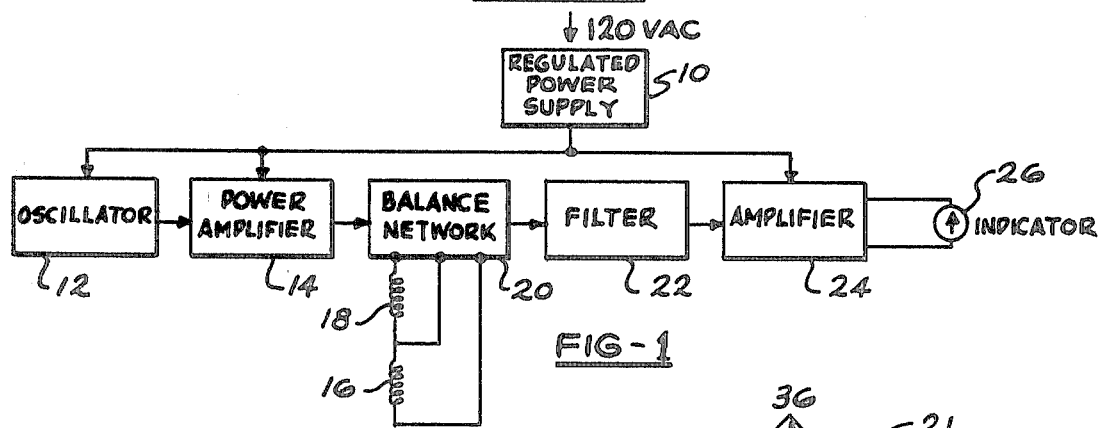
FIG. 1 is a schematic diagram of the preferred embodiment of the invention.

The schematic diagram of FIG. 1 depicts the ferrite detector in schematic form. The detector circuitry includes a regulated power supply 10 which may be either a 120 volt AC source with Zener diode regulation or a battery source when AC power is not available. The power supply is designed to provide a power source for the several other sections of the detector circuitry. An oscillator 12 generates a sine wave at 5,000 hertz, or at any other frequency suitable for the material being checked. The sine wave is amplified by a power amplifier 14 to provide an alternating current energizing potential of several volts to the test coils 16 and 18 and, additionally, to the balancing network 20. Test coils 16 and 18, in combination with the balancing network 20, create a bridge network 21 which will be described in greater detail below. The output of the bridge is connected to a filter, such as the 5,000 hertz band pass filter 22, to attenuate those frequencies above and below 5,000 hertz which result in harmonic distortion of the bridge output signal. The filtered signal is then amplified by a linear amplifier 24 and connected to an indicator, such as milliameter 26, for registering the variations in the signal appearing across the output of the bridge network.

Figure 2:
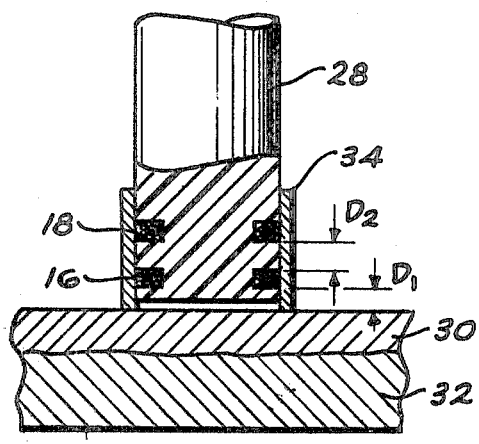
FIG. 2 provides a sectional view of the test probe of the invention in position for testing.

Test coils 16 and 18 are conveniently wound about a nonmagnetic form, such as the 0.5 inch diameter phenolic rod 28 of FIG. 2, to maintain the rigidity and proper spacing of the two coils which form the detector probe. Test coils 16 and 18 are similar to one another for convenience of manufacture and bridge balancing and in the embodiment herein described, each is comprised of 180 turns of No. 38E coated wire. Coils 16 and 18 are connected in series across the output of power amplifier 14, which typically has an output of about 2 watts. Coil 16 is located as near the operational end of the probe rod 18 as possible, while coil 18 is located a short distance farther back along probe rod 28. This difference in the placement of the two coils results in a greater coupling between the test material and coil 16, than between the test material and coil 18, when probe rod 28 is in the operating position. Though both coils 16 and 18 are depicted as circular in this embodiment, other configurations would be equally acceptable. Also, the cross-sectional area of the coils may be varied to obtain average measurements over a greater or lesser area of material.

FIG. 2 shows coil 16 and 18 operationally disposed adjacent the material to be tested for ferrite content. The test material in this instance is a stainless steel cladding 30, which is deposited over a base metal 32. Coils 16 and 18, when energized by a source of alternating current, generate a magnetic field which induces eddy currents in the test material through magnetic coupling between the coils and the material. The eddy currents, in turn, create an opposing magnetic field which modifies the initial exciting field. This modification is manifested by an apparent change in the impedance of the test coils. The coil closest to the test material 30 is affected greatest by the eddy currents. As the ferrite content of a material varies from one sample to another, so also will its permeability change accordingly. This results in a change in the apparent impedances of the test coils, with the closer coil (16) experiencing a greater change than the more distant coil (18). An impedance relationship comprising the ratio of the impedance of one of the coils to the sum of the impedances of both coils is established as a measure of ferrite content. This impedance relationship is linearly proportional to the ferrite content of the sample being measured. Coils 16 and 18 may be connected across a balancing network as two arms of an impedance bridge, whereby the amplitude of the bridge output signal is directly proportional to said ratio and accordingly, is linearly proportional to ferrite content.

The depth of magnetic coupling is determined to a large extent by the frequency of the alternating current. A 2 watt, 5,000 hertz signal will have a coupling penetration depth of about 0.1 inch, and significantly increasing the power at that frequency will extend the coupling penetration to only about 0.3 inch. Therefore, detectors operated in this frequency and power range will be affected little, if at all, by the ferromagnetic properties of the base metal 32 when the thickness of the cladding 30 being tested is greater than about 0.1 inch. An increase in the alternating current frequency will serve to further decrease the coupling penetration.

The spacing between coil 16 and test material 30 and that between coil 16 and coil 18, when operating at 5,000 hertz and several watts, is relatively small. Typically, the spacing $D_1$ between coil 16 and test material 30 may range up to 0.25 inches, and the spacing $D_2$ between coils 16 and 18 will be in the range between 0–0.15 inches when operating at the aforementioned frequency and power. In the preferred embodiment, spacing $D_2$ is 0.05 inch. Spacer 34 is provided to establish and maintain the spacing $D_1$ and consists of a cylinder of nonmagnetic material which slidably engages probe rod 28.

Figure 3:
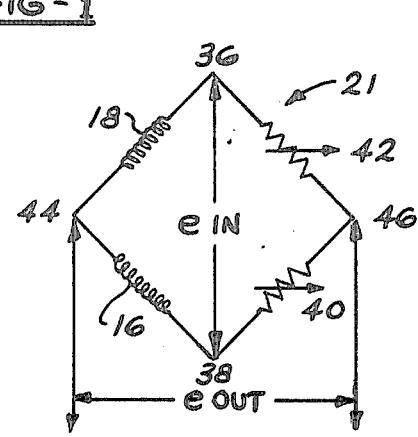
FIG. 3 schematically illustrates the circuitry of the balancing network.

The bridge network 21 of FIG. 3 provides a schematic illustration of the manner in which the output signal is derived. The alternating current output of power amplifier 14 is connected across bridge 21 at input terminals 36 and 38 and is represented as $e_{in}$. Test coils 16 and 18, which form two arms of bridge 21, are connected in a series aiding relationship across the input terminals 36 and 38. While coils 16 and 18 might be differentially wound and function adequately as elements of the bridge network, the unidirectionally wound, series aiding configuration of the preferred embodiment provides a linear output signal for a greater range of relative ferrite concentrations. Variable impedances 40 and 42 comprise the balancing network 20 for null balancing bridge 21. Impedances 40 and 42 are, for convenience, variable resistors. While one of the balancing resistors might be fixed and the other varaible, a greater balancing flexibility is provided if both are variable.

Figure 4:
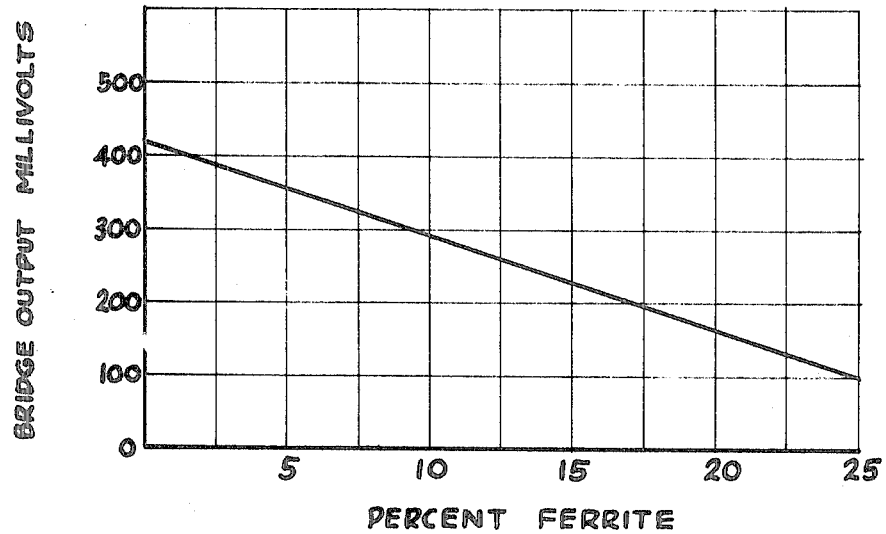
FIG. 4 is a plot of the bridge output voltage for various relative ferrite concentrations of the test material.

The output of bridge 21 appears across output terminals 44 and 46 and is presented as "$e_{out}$." $E_{out}$ will be zero, or nearly so, when the bridge is null balanced and will be an AC voltage when the bridge is unbalanced. The magnitude of this voltage is seen, in FIG. 4, to have a particular linear relationship with the ferrite content of the test material for predetermined values of $D_1$, $D_2$, frequency, input power, and coil geometry. The above mentioned parameters may be varied somewhat and $e_{out}$ will still have a linear relationship with the ferrite content, though the voltage plot will have a different slope. The bridge is balanced with a high ferrite content material, therefore, $e_{out}$ is larger for lower ferrite contents (5 percent) than for higher ones (20 percent).

The output of bridge 21 is filtered by a band pass filter 22 to attenuate harmonic distortion occurring in the bridge output signal. The filtered signal, which is in the millivolt range, is then amplified by a conventional linear amplifier 24 and rectified to serve as an input to a voltage or current responsive indicator, such as taut-band milliameter 26. Milliameter 26 is linearly responsive to the magnitude of the input signal. Typically, the dial of meter 26 will be calibrated in "percent ferrite" for a range of 0–30 percent ferrite. Conventional calibration and zeroing controls permit scaling the bridge output signal to the dial of meter 26.

To operate the detector of the invention, a probe-to-work spacing, $D_1$, is established for a particular probe, the bridge is balanced, and the output indicator calibrated. The detector is then ready for making test readings, with the only variable being the relative ferrite content of the test material.

The preferred probe orientation places the axis of probe rod 28 normal to the surface of the material being tested, thus placing each of coils 16 and 18 in different planes substantially parallel to the surface of the test material.

A high ferrite material, (40–50 percent) such as carbon steel, is used for null balancing bridge 21. This ensures that ferrite concentrations in the range of interest (0–30 percent) will provide bridge output voltages which uniformly increase (or decrease) across the range without passing through a null. This will maintain the linearity of the bridge output over the range of interest.

Once bridge 21 is balanced, the detector is calibrated by scaling the bridge output signal to the dial of meter 26. This is performed empirically by placing probe rod 28 alternately on each of two standard samples of known ferrite content (e.g. 5 percent and 20 percent) and adjusting the calibration and zero controls to obtain the corresponding readings on the dial of meter 26. These controls operate in a known manner to change the slope and offset the origin of the linear $e_{out}$ response to match that of the calibrated dial of meter 26, as determined by the sensitivity of the meter, and does not affect the linearity of the $e_{out}$ response. Thus, an area of test material 30 of unknown ferrite content may now be tested by positioning the probe rod 28 at the test material in the same manner as when balancing and calibrating the detector and then reading the relative ferrite content directly from the dial of meter 26.

While the balancing and calibrating operations have been described using three materials, each having different ferrite contents, it will be realized that this might be reduced to two by null balancing with a material whose relative ferrite content is that of the upper extreme of the desired range of sensitivity. This material would then also serve as one of the two standard samples used in calibrating the detector.

The detector of the invention may easily be adapted to continuously monitor a weld deposit as it is being deposited. This is of particular advantage in automatic welding wherein the weld is deposited at a controlled speed. The sensing probe may be located a suitable distance behind the arc or molten puddle and adapted to follow the weld path while a constant probe-to-work spacing is maintained. The detector response might be continuously monitored or adapted to trigger an alarm when ferrite readings deviate beyond preset limits.

While we have illustrated and described a preferred embodiment of our invention it is to be understood that such is merely illustrative and not restrictive and that variations and modifications may be made therein without departing from the spirit and scope of the invention. We, therefore, do not wish to be limited to the precise details set forth but desire to avail ourselves of such changes as fall within the purview of our invention.

What we claim is:

1. A method for determining the relative ferrite content of a material comprising the steps of:
   a. applying a predetermined AC voltage across first and second coils connected in series for generating a magnetic field of predetermined magnitude;
   b. generating an AC reference voltage;
   c. obtaining a voltage comparison signal which varies in amplitude in proportion to the difference between said reference voltage and the voltage existing at the junction of said first coil with said second coil;
   d. positioning each of said first and second coils a different distance from the surface of a first sample material having a predetermined relative ferrite content to allow magnetic coupling therewith, thereby differently affecting the impedance of each of said coils;
   e. measuring the amplitude of said voltage comparison signal for said first sample material;
   f. positioning each of said first and second coils said different distances from the surface of a second sample material having a predetermined relative ferrite content different than said first sample to allow magnetic coupling therewith, thereby differently affecting the impedance of each of said coils;
   g. measuring the amplitude of said voltage comparison signal for said second sample material;
   h. positioning each of said first and second coils said different distances from the surface of a third sample material of unknown relative ferrite content to allow magnetic coupling therewith, thereby differently affecting the impedance of each of said coils;
   i. measuring the amplitude of said voltage comparison signal for said sample of unknown relative ferrite content; and
   j. comparing said measured signal amplitude for said material of unknown ferrite content with said measured signal amplitudes for said first and second samples of predetermined ferrite content, whereby the relative ferrite content of said third sample is indicated by the linear relationship of said measured signal amplitude for said third sample with said measured signal amplitude for said first and second samples of predetermined relative ferrite contents.

2. A method for determining the relative ferrite content of a material in accordance with claim 1 and wherein the step of generating said AC reference voltage is accomplished by the steps of:
   a. applying said predetermined AC voltage across first and second impedances connected in series; and
   b. using the voltage appearing at the junction of said first and second impedances as said reference voltage.

3. A method of determining the relative ferrite content of a material in accordance with claim 1 and further including the steps of:
   a. initially positioning each of said first and second coils said different distances from the surface of a sample of high-ferrite material having a relative ferrite content greater than either of said first and second samples and at least as high as the upper limit of the desired range of relative ferrite measurements to allow magnetic coupling therewith, thereby differently affecting the impedance of each of said coils; and
   b. adjusting the amplitude of said reference voltage until the amplitude of said voltage comparison signal is a minimum.

4. A method of determining the relative ferrite content of a material in accordance with claim 2 and further including the steps of:
   a. initially positioning each of said first and second coils said different distances from the surface of a sample of high-ferrite material having a relative ferrite content greater than either of said first and second samples and at least as high as the upper limit of the desired range of relative ferrite measurements to allow magnetic coupling therewith, thereby differently affecting the impedance of each of said coils; and
   b. adjusting the amplitude of said reference voltage until the amplitude of said voltage comparison signal is a minimum.

5. A method for determining the relative ferrite content of a material in accordance with claim 1 wherein each said step of positioning each of said first and second coils a different distance from said sample material surface comprise:
   a. positioning said first coil a distance less than 0.25 inch from said surface; and
   b. positioning said second soil a distance from said surface greater than said first coil distance and less than 0.15 inch from said first coil.

6. A method for determining the relative ferrite content of a material in accordance with claim 4 wherein each said step of positioning each of said first and second coils a different distance from said sample material surface comprise:

a. positioning said first coil a distance less than 0.25 inch from said surface; and
b. positioning said second coil a distance from said surface greater than said first coil distance and less than 0.15 inch from said first coil.